(12) United States Patent
Faure et al.

(10) Patent No.: US 7,085,447 B2
(45) Date of Patent: Aug. 1, 2006

(54) SYSTEM FOR OPTICALLY DEMULTIPLEXING WAVELENGTH BANDS

(75) Inventors: Jean-Paul Faure, Paris (FR); Arnaud Bisson, Orsay (FR); Nicolas Le Sauze, Bures-sur-Yvette (FR)

(73) Assignee: Alcatel, Paris (FR)

( * ) Notice: Subject to any disclaimer, the term of this patent is extended or adjusted under 35 U.S.C. 154(b) by 61 days.

(21) Appl. No.: 10/491,147

(22) PCT Filed: Sep. 26, 2002

(86) PCT No.: PCT/FR02/03280

§ 371 (c)(1),
(2), (4) Date: Mar. 26, 2004

(87) PCT Pub. No.: WO03/028263

PCT Pub. Date: Apr. 3, 2003

(65) Prior Publication Data

US 2005/0238283 A1    Oct. 27, 2005

(30) Foreign Application Priority Data

Sep. 27, 2001  (FR)  ................................ 01 12448
Oct. 11, 2001  (FR)  ................................ 01 13102

(51) Int. Cl.
*G02B 6/28*  (2006.01)

(52) U.S. Cl. .......................................... 385/24; 398/79
(58) Field of Classification Search .................. 385/24
See application file for complete search history.

(56) References Cited

U.S. PATENT DOCUMENTS 6,067,178 A    5/2000   Zheng
6,208,444 B1   3/2001   Wong et al.

FOREIGN PATENT DOCUMENTS

| EP | 0 874 489 A2 | 10/1998 |
| EP | 1 043 859 A2 | 10/2000 |
| EP | 1 213 866 A1 | 6/2002 |
| WO | WO 01/05082 A1 | 1/2001 |
| WO | WO 01/16558 A1 | 3/2001 |
| WO | WO 01/41347 A1 | 6/2001 |

*Primary Examiner*—Sung Pak
(74) *Attorney, Agent, or Firm*—Sughrue Mion, PLLC

(57) ABSTRACT

An optical demultiplexer system for separating adjacent wavelength bands without losing inter-band channels and comprising a first filter stage (210) of relatively narrow passband and relatively high selectivity in order to extract all of the inter-band channels. The first stage is followed by a second filter stage (240) of relatively broad passband and relatively low selectivity to extract the wavelength bands delivered by the first filter stage. Such a system makes it possible to use the inter-band channels, in particular for managing the network and the wavelength bands.

5 Claims, 2 Drawing Sheets

SYSTEM FOR OPTICALLY DEMULTIPLEXING WAVELENGTH BANDS

BACKGROUND OF THE INVENTION

The present invention relates to optical fiber transmission technology by spectrum division multiplexing, and more particularly it relates to a system enabling wavelength band separation to be improved in a transmission mode where a large number of channels having the same destination are transported by a respective sequence of different wavelengths that are regularly distributed in the spectrum, all of these wavelengths being transported by the same fiber and constituting a so-called "band". In other words, the spectrum of a band is in the form of a comb of finite width, and with teeth that are regularly spaced apart. A plurality of bands may be interlaced if the spectrum space between two successive channels in a band is at least equal to the space needed for a channel.

In recent years, enormous demand for bandwidth has been initiated by the deployment of modern forms of telecommunications, in particular the Internet and its main application the world wide web, but also all of the private networks of businesses and various other organizations, not forgetting wireless communications, in particular mobile telephony which, in practice, requires high performance terrestrial infrastructure to meet customer expectations. To satisfy this demand, those in charge of implementing the networks needed for deploying such novel forms of communication have rapidly needed to have recourse to transporting signals carrying information in optical form in order to benefit firstly from the low cost of fibers themselves and secondly from the very high data rates that can be achieved in spite of transmission distances that can be measured in kilometers or even tens or hundreds of kilometers, without any need for signal regeneration. Attenuation is very low, in particular in so-called "single mode", fibers, when compared with the level of attenuation that can be obtained for electrical transmission using copper, for example. Furthermore, optical transmission avoids all problems associated with electromagnetic disturbances which require expensive protection circuits and can lead to frequent errors in transmission.

A first step in the use of optical fibers consisted essentially in point-to-point links between two nodes of a network. During that first step, transport took place over a single wavelength, usually around 1550 nanometers (nm) since that is the wavelength that is most suitable for long distance transport. Although optical signals can be modulated up to very high frequencies, which are expressed in gigabits per second (Gb/s, i.e. $10^9$ bits per second), the quantity of information that needs to be transported rapidly outgrew the available capacity. Although the fiber itself is of low cost, deploying it can require a large amount of labor and can be extremely expensive. Instead of deploying larger numbers of optical fibers when the capacity of an installed network becomes insufficient, a solution has been found in making better use of those fibers that are already in place. The technique of wavelength division multiplexing (WDM) makes it possible to increase the number of completely independent transmission channels within a single physical fiber by transmitting different wavelengths along the same fiber. In other words, by transmitting light rays of different "colors", the bandwidth of a single fiber is increased correspondingly. The technique of dense WDM (DWDM) quickly supplanted WDM and now makes it possible to multiplex hundreds of channels, or even more.

It has been shown that, under most circumstances, routing wavelengths in groups, i.e. bands (as contrasted with conventional routing by individual wavelengths) leads to a reduction in the overall cost of an optical network insofar as it enables the cost of the filter and switch devices present in nodes to be shared between the various different wavelengths making up a band. Furthermore, amongst the band configurations that are suitable for use for routing purposes, contiguous or adjacent wavelength bands present a major advantage over interlaced wavelength bands in that they use simpler filter devices that are less expensive and also more tolerant from the point of view of the physical constraints they impose (in contrast to interlaced bands which require filter devices that filter each wavelength individually).

Such fibers are used for interconnecting optical switching equipment situated at the various nodes of a network. An essential device at a network node is then an optical add/drop multiplexer (OADM). As its name suggest, it serves to remove or demultiplex and to insert or multiplex local traffic optically (e.g. traffic that is local to an inlet/outlet point for a secondary network), while allowing the remainder of the traffic to continue its journey towards other nodes of the network. This assumes that at least one wavelength carrying local information (one channel) can be dropped and added. In practice, for the reasons mentioned above, it is usually wavelength bands (sequences of channels) that need to be dropped and added in this way in order to be able to exchange a sufficient quantity of information with local applications.

This is shown in FIG. 1, which shows an ordinary optical demultiplexer 100 separately extracting three wavelength bands of a multiplex constituted by a sequence of channels distributed at regular intervals within the spectrum:

a band 110 constituted by four channels carried respectively by a first group of four wavelengths;

a band 120 constituted by four channels carried respectively by a second group of four wavelengths; and a band 130 constituted by four channels carried respectively by a third group of four wavelengths.

The bands 110 and 120 are separated by a band 139 corresponding to two channels, but which is not used for transmitting signals. The bands 120 and 130 are separated by a band 140 corresponding to two channels, but which is not used for transmitting signals. If ordinary band demultiplexing equipment is used, the bands 110, 120, 130 cannot be extracted without it being necessary to sacrifice so-called "inter-band" channels between the bands 110 and 120 and between the bands 120 and 130. This is due to the great proximity of contiguous wavelengths that can be transported in so-called DWDM mode (involving spectrum separations between channels of 100 GHz, 50 GHz, or even 25 GHz), and to the limitations inherent to the spectral discrimination ability (also known as selectivity) of ordinary band demultiplexing equipment, such as the demultiplexer 100.

In FIG. 1, the passband of the ordinary demultiplexer 100 is represented by a trapezoid 150 having sides of slope that is not sufficiently steep. This passband is broad enough to cover the channels of a wavelength band (four channels in this example) but is of selectivity that is insufficient for effectively eliminating the inter-band channels constituting the bands 139 and 140. These inter-band channels therefore cannot be used, thereby significantly reducing the transport capacity on the optical fiber.

SUMMARY OF THE INVENTION

That is why the object of the invention is to provide an optical demultiplexing system enabling effective use to be made of these inter-band wavelengths that would otherwise be lost.

The present invention thus provides an optical demultiplexer system for separating out a single band forming part of a first comb of bands which is interlaced with at least one second comb of bands, each band being constituted by a plurality of channels having adjacent wavelengths, the system being characterized in that it comprises:

a first spectral demultiplexer stage for separately extracting each of the combs; and
  a second spectral demultiplexer stage for separately extracting each of the bands constituting a comb extracted by said first stage.

The system of the invention makes it possible to use all of the channels, and in particular the channels conventionally referred to as inter-band channels that were previously not used for transmitting signals. These channels now become usable, in particular for network management and for wavelength band management, since the system of the invention makes it possible to obtain sufficient selectivity, while requiring only means that are simple and inexpensive in each of the two stages.

BRIEF DESCRIPTION OF THE DRAWING

The objects, subject matter, characteristics, and advantages of the invention can be seen more clearly from the following detailed description of a preferred embodiment thereof illustrated by the accompanying drawings, in which.

DETAILED DESCRIPTION OF THE INVENTION

Figure 2:
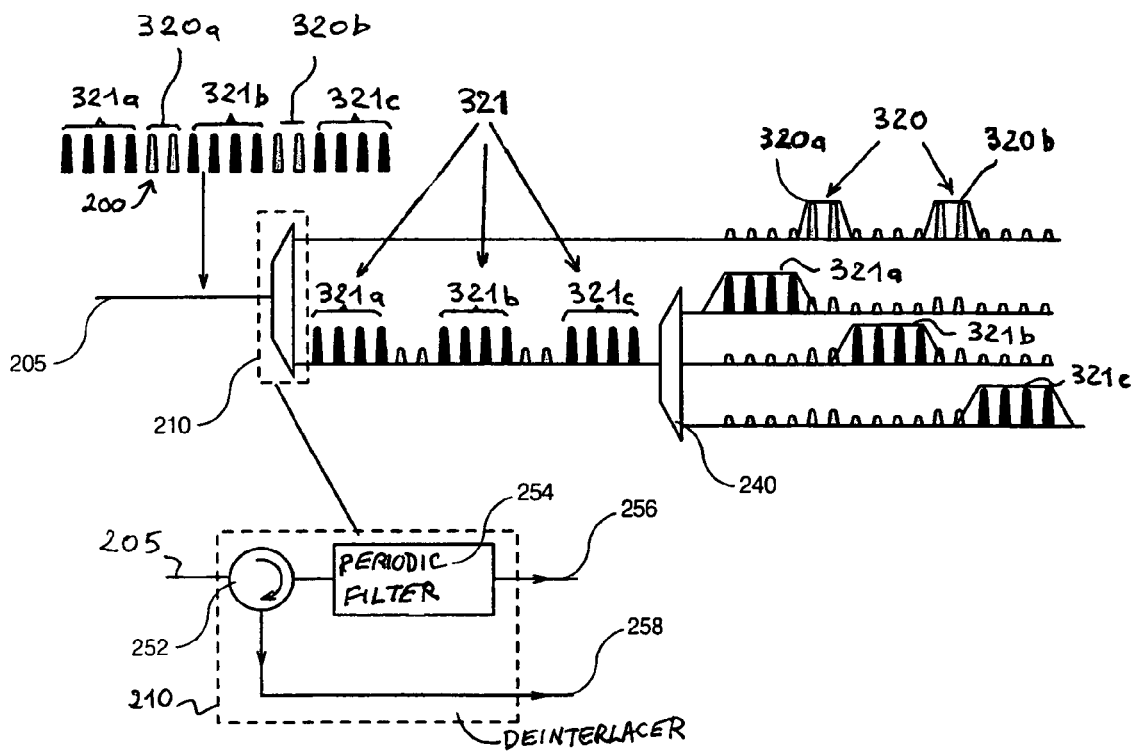
FIG. 2 shows a first embodiment of the optical demultiplexer system of the invention.

In the embodiment shown in FIG. 2, a multiplex 200 arrives on a fiber 205. It is made up of channels that are distributed at regular intervals. It is constituted by two interlaced combs:

a first band comb 321 constituted by three bands 321a, 321b, 321c each constituted by four channels used for transmitting signals; and
  a second band comb 320 constituted by two bands 320a and 320b each constituted by two "inter-band" channels, which are also used for transmitting signals.

The system comprises:

a first spectral demultiplexing stage of relatively narrow passband and relatively high selectivity, having as its main function extracting all of the inter-band channels; and
  a second spectral demultiplexing stage of relatively broad passband and relatively low selectivity for separating the wavelength bands that remain after all of the inter-band channels have been extracted by the first stage.

It is easy to make a first stage having high selectivity because the inter-band channel bands are of narrow width. The second stage can be an ordinary demultiplexer of low selectivity because of the initial highly effective elimination of the inter-band channels that is performed by the first stage.

The first stage is constituted by a periodic band deinterlacer 210 for separating the two combs 320 and 321. A first output from the demultiplexer 210 supplies the comb 320 (bands 320a and 320b) comprising all of the inter-band channels. These channels are extracted but remain multiplexed in a common multiplex in this first example. The two bands 320a and 320b can be used for transporting signals, but not separately. A second output from the deinterlacer 210 provides the comb 321 which comprises all of the channels that are used for transporting information. The band deinterlacer 210 is preferably constituted by a periodic filter (or a cascade of periodic filters) of sufficient selectivity to attenuate effectively the bands 320a and 320b of the inter-band channels from the multiplex (comprising the bands 321a, 321b, 321c) that is applied to the second output.

The second stage is constituted by a periodic band demultiplexer 240. It has three outputs separately delivering the bands 321a, 321b, and 321c. There is no harm in the demultiplexer constituting the second stage 240 being an ordinary demultiplexer for contiguous wavelength bands, having low spectral selectivity since the inter-band channels (bands 320a and 320b) have previously been extracted with high selectivity by the first stage 210.

Implementation of the deinterlacer of the stage 210 makes use of techniques that are known to the person skilled in the art. Nevertheless, it is shown in greater detail in an enlarged portion of FIG. 2. It comprises a circulator 252 having an input connected to the fiber 205, and a first output connected to a periodic optical filter 254, e.g. a Fabry-Perot filter. The spectral separation power of the filter 254 must be sufficient to enable the bands 320a and 320b of inter-band channels to be extracted. These bands appear on the output 256 of the periodic filter 254. A second output 258 of the circulator 252 constitutes the second output of the deinterlacer 210 which delivers the bands 321a, 321b, and 321c. It should be observed that since a circulator 252 is an expensive component, it can advantageously be replaced by an isolator followed by a simple coupler.

Figure 3:
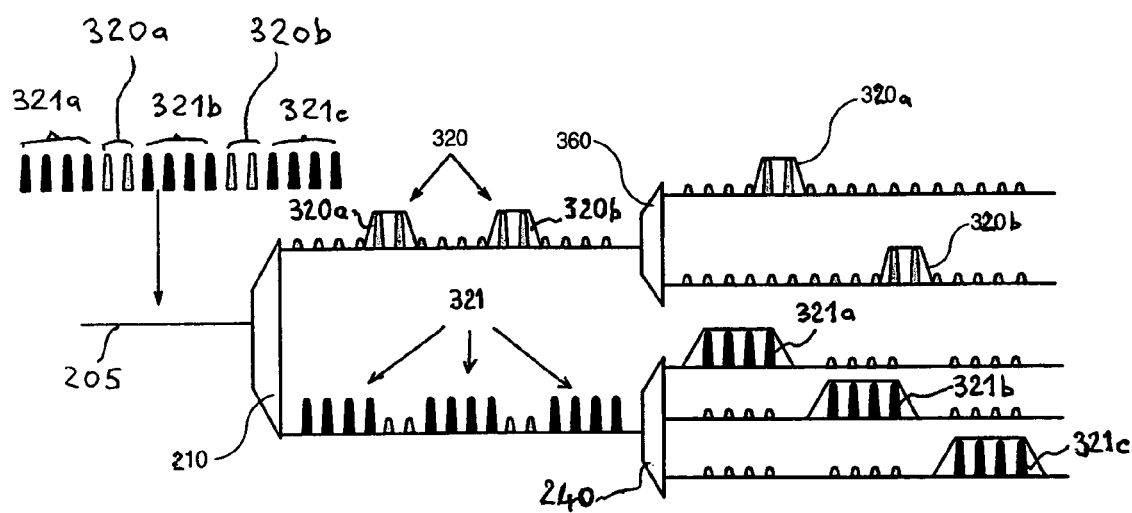
FIG. 3 shows a second embodiment of the optical demultiplexer system of the invention.

FIG. 3 reproduces the content of FIG. 2 for the most part. It shows a demultiplexer system for the situation in which the two inter-band channels 320a and 320b are used separately. In addition to the means of the first embodiment shown in FIG. 2, this second embodiment includes a periodic band demultiplexer 360 having one input connected to the first output of the deinterlacer 210 and having two outputs for separately extracting the bands 320a and 320b which are also used for transporting signals.

Each of the periodic band demultiplexers 240 and 360 preferably comprises a periodic filter made up of deposited thin layers.

Thus, the invention enables the inter-band channels to be used, whereas in the past they were normally unusable. In a preferred embodiment of the invention, these channels are used for controlling the network itself, carrying all of the information needed for proper operation of the network and for keeping it at an optimum level of performance. In a DWDM mode of transport based on techniques of mixing numerous wavelengths on optical fibers interconnecting OADM stations where wavelength bands are to be dropped locally while others are added, careful management is essential for them to be used effectively. This management requires one or more control channels which advantageously make use of the inter-band wavelengths that are made usable again by implementing the invention.

Figure 1:
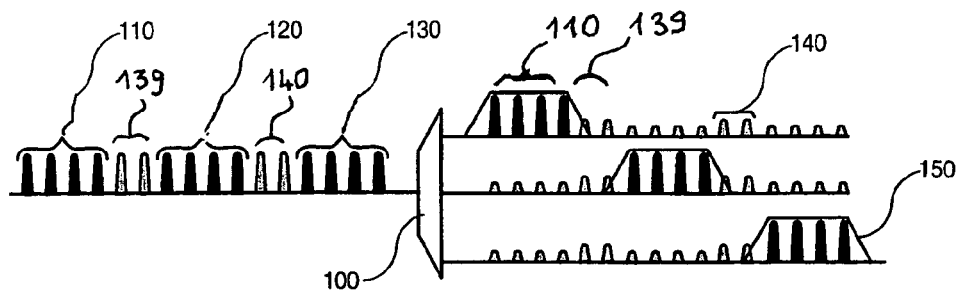
FIG. 1, as described above, shows a prior art mode of transmission in which a large number of wavelengths are transported over the same optical fiber, but in which the inter-band channels are unusable.

Finally, it should be observed that the number of inter-band channels is shown in FIGS. 1 to 3 as being two, both when describing the prior art and when describing the invention, but that it could naturally be different from the number two which is merely a particular example. Specifically, in a preferred embodiment of the invention, it is possible to use only one single inter-band channel by selecting a band demultiplexer 240 which is sufficiently selective for this to be possible or because the wavelengths selected make this possible by being sufficiently spaced apart spectrally. It is then possible to obtain one-to-one correspondence between a wavelength band and one or other of the contiguous inter-band channels, which channels can be used for controlling the wavelength band.

The invention claimed is:

1. An optical demultiplexer system for separating out a single band (321a) forming part of a first comb of bands (321) which is interlaced with at least one second comb of bands (320), each band of the first comb of bands being constituted by a plurality of channels having adjacent wavelengths, the system being characterized in that it comprises:
   a first spectral demultiplexer stage (210) for separately extracting each of the combs (320, 321); and
   a second spectral demultiplexer stage (240; 360) for separately extracting each of the bands (321a, . . . ) constituting a comb extracted by said first stage,
   said first stage having a first, relatively narrow passband and a first, relatively high selectivity, and
   said second stage having a second passband, broader than said first passband, and having a second selectivity lower than said first selectivity.

2. An optical demultiplexer system according to claim 1, characterized in that said first stage (210) comprises a periodic filter including a circulator (252) and a Fabry-Perot type periodic filter (254).

3. An optical demultiplexer system according to claim 1, characterized in that said second stage (240; 360) comprises a periodic filter constituted by deposited thin layers.

4. The optical demultiplexer system according to claim 1, wherein each of said bands of said first combs are constituted by a first plurality of channels carried by respective groups of different wavelengths, and
   wherein said bands of said second comb are constituted by a second plurality of channels which is less than said first plurality of channels.

5. The demultiplexer according to claim 4, wherein said first plurality of channels is four channels, and wherein said second plurality of channels is two channels.

* * * * *